United States Patent [19]

Simon et al.

[11] Patent Number: 5,299,904
[45] Date of Patent: Apr. 5, 1994

[54] VEHICLE LIFT WITH CONTACT SENSOR

[75] Inventors: Curtis J. Simon, Pine Grove; Dale Kempf, Clovis, both of Calif.

[73] Assignee: Hogan Mfg., Inc., Escalon, Calif.

[21] Appl. No.: 858,994

[22] Filed: Mar. 26, 1992

[51] Int. Cl.⁵ .................................. B60P 1/44
[52] U.S. Cl. .................. 414/541; 414/545; 414/921
[58] Field of Search ............ 414/540, 541, 545, 921, 414/546, 549, 556–558; 187/9 R

[56] References Cited

U.S. PATENT DOCUMENTS

| | | | |
|---|---|---|---|
| 2,797,104 | 6/1957 | Drobney et al. | 280/166 |
| 3,588,160 | 6/1971 | Reiner | 293/73 |
| 3,955,827 | 5/1976 | Wonigar | 280/166 |
| 3,984,014 | 10/1976 | Pohl | 414/921 X |
| 4,071,152 | 1/1978 | Kinkead et al. | 414/541 |
| 4,134,504 | 1/1979 | Salas et al. | 414/921 X |
| 4,251,179 | 2/1981 | Thorley | 414/545 |
| 4,369,984 | 1/1983 | Hagen | 280/166 |
| 4,392,771 | 7/1983 | Smalley | 414/545 |
| 4,407,623 | 10/1983 | Parks | 414/540 |
| 4,466,771 | 8/1984 | Thorley et al. | 414/921 X |
| 4,544,321 | 10/1985 | Lanier | 414/542 |
| 4,576,539 | 3/1986 | Williams | 414/921 X |
| 4,583,466 | 4/1986 | Reddy et al. | 414/921 X |
| 4,671,730 | 6/1987 | Gateau | 414/495 |
| 4,751,983 | 6/1988 | Leskovec et al. | 187/9 R |
| 4,787,111 | 11/1988 | Pacek et al. | 14/71.1 |
| 4,909,700 | 3/1990 | Fontecchio et al. | 414/549 |
| 4,928,330 | 5/1990 | Moore | 4/562 |
| 4,941,216 | 7/1990 | Boublil | 4/496 |
| 5,052,879 | 10/1991 | Wolfe | 414/921 X |
| 5,158,419 | 10/1992 | Kempf et al. | 414/921 X |

Primary Examiner—David A. Bucci
Attorney, Agent, or Firm—Christensen, O'Connor, Johnson & Kindness

[57] ABSTRACT

A vehicle lift (10) for transporting a wheelchair passenger between a ground-level position adjacent the vehicle (12) to a position adjacent to and substantially coplanar with the vehicle floor (14) includes a contact sensor (16) for detecting when the lift platform contacts a curb or other object. A carriage assembly (20) includes a pair of slides (34) that ride on a pair of rails (36). As the platform is lowered, the relative position of the slides (34) and the rails (36) changes. The sensor (16) detects a relative position of one of the slides (34) and the corresponding rail (36). When the sensor (16) detects a relative position of the slide (34) and the rail (36) indicating that the platform has contacted a curb or other object, the sensor (16) generates a control signal. A lift controller (60) stops lowering of the platform in response to the control signal from the sensor (16).

26 Claims, 5 Drawing Sheets fig. 1.

VEHICLE LIFT WITH CONTACT SENSOR

FIELD OF THE INVENTION

The present invention relates to a lift for use in a transit vehicle, and more particularly, to a lift having a contact sensor for use during lowering of the lift platform to detect if the lift platform has contacted a curb or other object. Although the lift according to the present invention may be used in a variety of vehicles to transport a variety of things, emphasis is placed on its use in a bus to transport a wheelchair passenger.

BACKGROUND OF THE INVENTION

A number of lifts have been developed in order to aid handicapped persons, in particular, wheelchair passengers, in boarding and exiting vehicles such as buses, trains, vans, and the like. One type of lift, commonly known as a "step lift," is disclosed in U.S. Pat. No. 4,466,771 to Thorley. The step lift is designed to be installed in the stairwell of a transit vehicle, and includes hinged panels that are movable between a step position and a platform position. In the step position, the hinged panels form steps for use by passengers to board and exit the vehicle. In the platform position, the hinged panels form a horizontal platform for use to raise and lower a wheelchair passenger between a vehicle floor-level position and a ground-level position. The hinged panels are attached to a carriage assembly that may be driven upward or downward to raise or lower the platform.

Typically, passengers board and exit a bus from a curb along the edge of a street. A lift generally is configured such that the carriage assembly has a lowermost point of travel that enables lowering of the platform to a street level position in order to accommodate wheelchair passengers in those instances in which boarding or exiting of the vehicle occurs from the street level rather than from a curbside. Thus, in cases where there is a curb, the height of the curb is above the lowermost point of travel of the carriage assembly. It is important to stop downward movement of the carriage assembly, i.e., lowering of the platform, at the time that the platform contacts a curb or other object. If lowering of the platform is not stopped at that time, the lift may be damaged, a passenger on the lift may be frightened and/or injured, and/or the lift may jack the vehicle.

A number of different arrangements for stopping lowering of a lift platform when the platform contacts a curb or other object have been developed. For example, U.S. Pat. No. 4,466,771 to Thorley discloses a wheelchair lift in which a sensitive edge is provided on the bottom of the platform. When the sensitive edge contacts an object, a switch is actuated to stop the motor, and hence lowering of the platform. Since it is located on the underside of the platform, the sensitive edge is susceptible to damage from ground abrasion and also to deterioration from rust, dirt, ice, or the like.

U.S. Pat. No. 4,071,152 to Kinkead et al. describes a wheelchair lift in which a ball nut engages one of the drive shafts for the platform. As the platform is lowered, the drive shaft rotates such that the ball nut is driven down the shaft. When the platform contacts an object, the drive shaft continues to rotate, driving the ball nut further down the shaft into contact with an actuator arm that activates a switch which in turn deenergizes the motor and applies the brake to stop lowering of the platform. U.S. Pat. No. 4,392,771 to Smalley describes a safety switch system for a wheelchair lift in which reciprocating hydraulic motor cylinders are mounted in vertical slots such that the cylinders are vertically movable. A projection is provided on one of the cylinders. When the platform contacts an object, the cylinders move upward in the slots, and the projection on the one cylinder actuates a safety switch to stop lowering of the platform. U.S. Pat. No. 4,407,623 to Parks describes a lift provided with a reaction switch attached to the main frame by way of bridging members held together by resilient members. When the platform contacts an object, torsional forces are transmitted to the bridging members, thereby moving the bridging members away from each other against the bias of the resilient members to engage the reaction switch. Actuation of the reaction switch terminates movement of the platform. The means for stopping lowering of the platform disclosed in these references have a relatively complex structure.

A sensing device that is protected from the environment and has a simple construction is desirable for use in detecting contact of a vehicle lift platform with the ground.

SUMMARY OF THE INVENTION

The present invention provides a lift, designed for use with a transit vehicle such as a bus, for helping a handicapped passenger, e.g., a wheelchair occupant, to board and exit the vehicle. The lift includes a carriage attachable to the vehicle and movable between an upper position and a lower position. The carriage includes at least one horizontally extending support member. A platform is attached to the support member and carried by the carriage. A raise/lower mechanism is operatively connected to the carriage for causing the carriage and the platform to move between the upper and lower positions. When the platform is in the upper position, the platform is located at a first relative position with respect to the support member, and when the platform is in the lower position, the platform is located at a second relative position with respect to the support member. A contact sensor detects the position of the platform relative to the support member and generates a control signal when the platform is in the second relative position, i.e., the position corresponding to the platform lower position. A lift controller is coupled to the sensor and controls the raise/lower mechanism to stop lowering of the platform in response to the control signal.

In a configuration in which the lift is a lift of the type disclosed in U.S. Pat. No. 4,466,771 to Thorley, the lift includes a step/platform assembly having a plurality of hinged panels that form steps in a step position and form a platform in a platform position. The hinged panels are connected to a pair of slides that ride on a pair of horizontal rails. When the slides are extended, the hinged panels are formed into the platform. The platform may be moved between an upper position and a lower position. The lift also includes an extension/retraction mechanism for causing the step/platform assembly to move between the step and platform positions, and a raise/lower mechanism for causing the platform to move between the upper and lower positions. When the platform is in a position other than the lower position, each of the slides is located at a first relative position with respect to the corresponding rail. When the platform is in the lower position, each of the slides is located at a second relative position with respect to the corresponding rail. The lift is provided with a sensor configured to detect whether the slides are in the first or second relative positions with respect to the rails. When the downwardly moving platform contacts the ground, the sensor detects that the slides are in the second relative position with respect to the rails and generates a corresponding control signal. In response to this control signal, a lift controller, coupled to the sensor, controls the raise/lower mechanism to stop lowering of the platform.

The present invention provides a ground sensing arrangement in which the relative position of lift members during normal operation of the lift is used to determine if ground contact has been made. The sensing arrangement takes advantage of normally occurring changes in the relative position of lift members and requires only the provision of a sensor to detect such relative position. Moreover, the area in which position is evaluated is internal to the lift, so damage from the environment is not problematic. The sensing arrangement of the present invention has a simple construction and is highly reliable.

BRIEF DESCRIPTION OF THE DRAWINGS

The invention will be described with reference to the accompanying drawings, wherein.

DETAILED DESCRIPTION OF THE PREFERRED EMBODIMENT

The following description is of the presently contemplated best mode of carrying out the invention. Although the invention is described with reference to a step lift for helping a wheelchair passenger board and exit a bus, the invention may be used in other applications where it is desirable to stop movement of a transport member when the transport member reaches a desired position.

Figure 1:
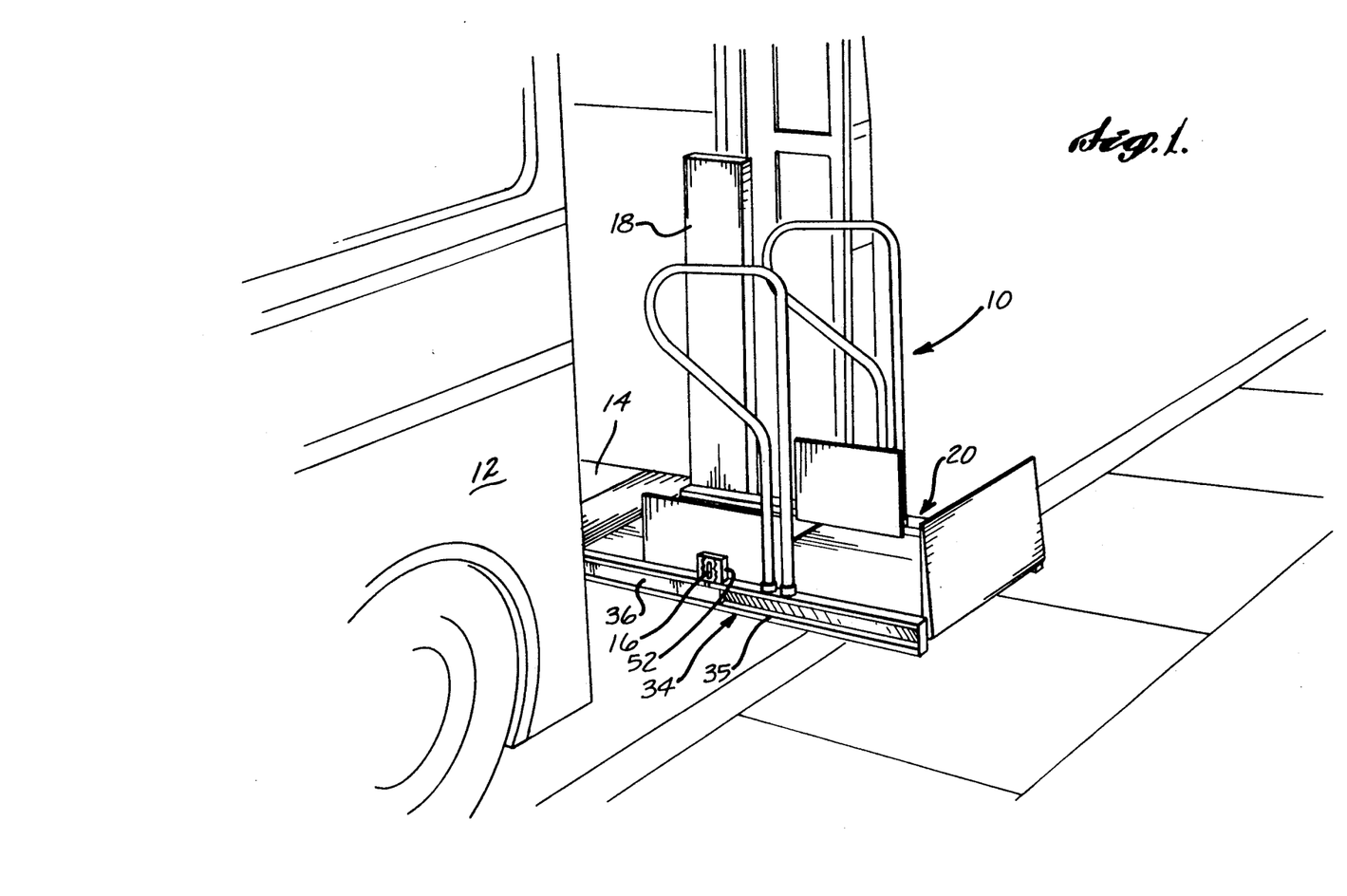
FIG. 1 is a perspective view of an embodiment of a step lift provided with a contact sensor in accordance with the present invention, installed in the stairwell of a transit vehicle.

FIG. 1 shows a lift 10 in accordance with the present invention as used in a bus 12. The floor 14 of the bus 12 is located a few feet above ground level. The lift 10 is situated in the stairwell of the bus 12 and is operable to transport a passenger between ground level and bus floor level. Typically, passengers enter and exit a bus from a curb at the edge of a street. The terms "curb" and "ground" are used interchangeably hereinafter. As discussed in greater detail herein, the lift includes a control system designed to stop lowering of the platform when a contact sensor 16 indicates that the platform has contacted a curb C or other object.

Figure 2:
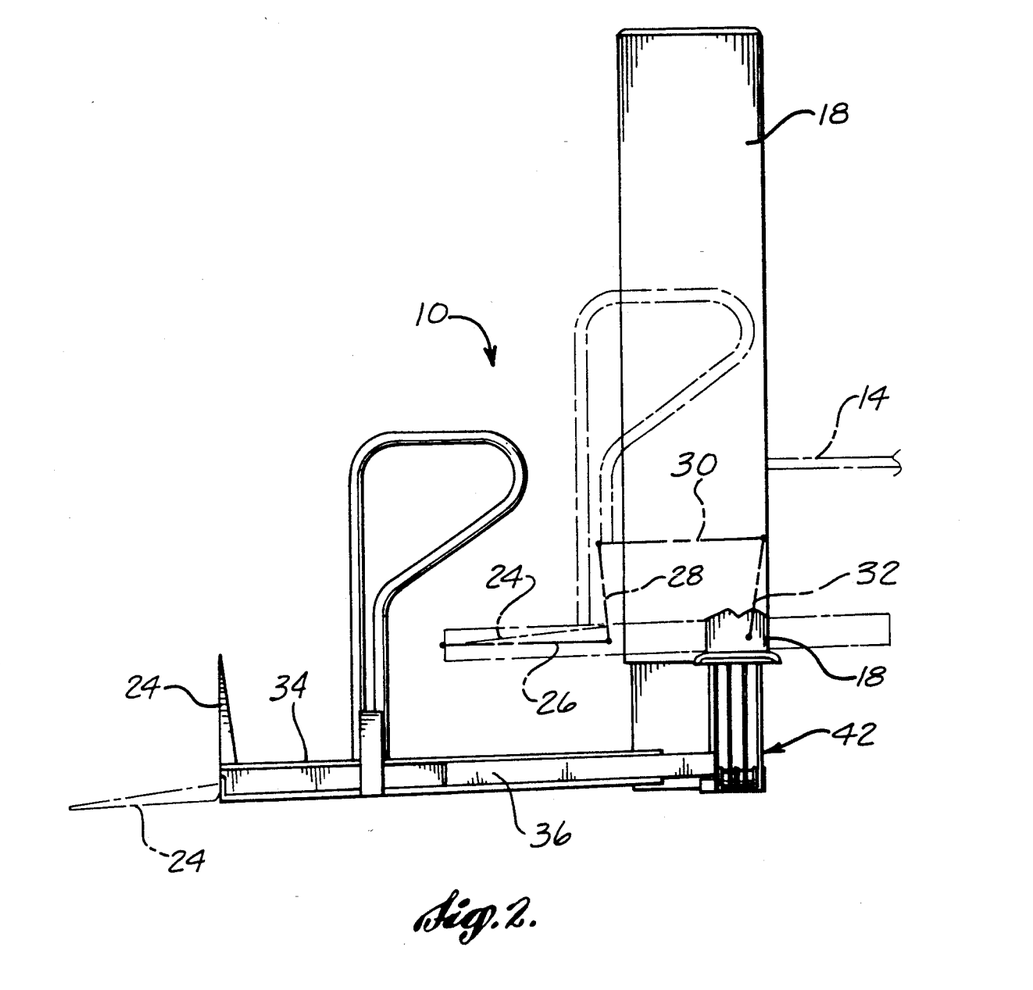
FIG. 2 is a side view of the step lift shown in FIG. 1, with the lift being shown in the platform position in solid view and in the step position in phantom view.

The structure of the lift 10 is described generally with reference to FIGS. 1 and 2. The lift 10 is a step lift of the type disclosed in U.S. Pat. No. 4,466,771 to Thorley et al. ("the '771 patent"). For details regarding the structure of the lift 10, one should refer to the '771 patent, which is herein incorporated by reference. The lift 10 includes a pair of towers 18 (only one of which is visible in FIG. 1). A carriage assembly 20 is configured to travel up and down between the towers 18. Attached to the carriage assembly 20, is a step/platform assembly 22 that serves as the steps of the entryway of the bus 12 when the step/platform assembly 22 is in a step position, and as a platform for transporting a wheelchair passenger when the step/platform assembly 22 is in a platform position. The step/platform assembly 22 comprises a plurality of hinged plates that can be folded into steps, and alternatively, extended into a platform. More specifically, the step/platform assembly 22 includes a barrier plate 24, a base plate 26, a riser plate 28, a step plate 30, and a back plate 32.

The carriage assembly 20 includes a pair of slides 34 (only one of which is visible in FIGS. 1 and 2) that ride on rails 36 (only one of which is visible in FIGS. 1 and 2). As shown in FIG. 2, the slides 34 may be moved between an extended position (illustrated in solid view) and a stowed position (illustrated in phantom view). The barrier plate 24, base plate 26, riser plate 28, step plate 30, and back plate 32 are pivotably attached to one another and are operatively connected to the carriage assembly 20 so as to permit the plates 24, 26, 28, 30, 32 to be moved between a step position (also referred to as the stowed position), illustrated in phantom view in FIG. 2, and a platform position (also referred to as the extended position), illustrated in solid view in FIGS. 1 and 2. In the step position, one surface of barrier plate 24 forms the first step of the steps of the bus 12, and step plate 30 forms the second step. In the platform position, the barrier plate 24, base plate 26, riser plate 28, step plate 30, and back plate 32 form a substantially planar platform. The barrier plate 24 is placed in an upright position as shown in FIG. 1 and in solid view in FIG. 2, when the platform is being used to transport a passenger. The barrier plate 24 is lowered to form a ramp, as shown in phantom view in FIG. 2, when a passenger is to exit or enter the platform.

Figure 3:
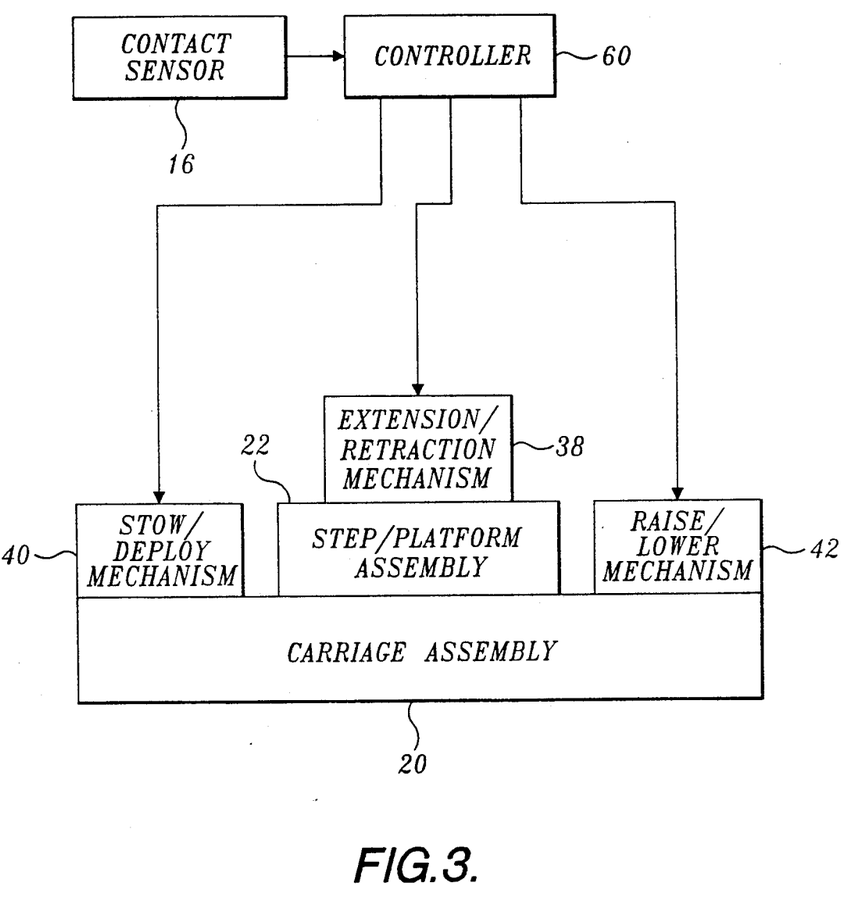
FIG. 3 is a block diagram of the lift having a contact sensor in accordance with the present invention.

An extension/retraction mechanism 38 (FIG. 3) is provided for causing the step/platform assembly 22 to move between the step and platform positions. A stow/deploy mechanism 40 operates in concert with the extension/retraction mechanism 38 to cause the carriage assembly 20 to move between a deployed position and a stowed position. A raise/lower mechanism 42 is coupled to the carriage assembly 20 to cause the carriage assembly 20 and the plates 24, 26, 28, 30, 32 of the step/platform assembly 22, when in the platform position, to move between a lower or ground level position, illustrated in solid view in FIG. 2, and an upper or floor level position (not illustrated) in which the platform defined by plates 24, 26, 28, 30, 32 is substantially coplanar with the floor 14 of the bus 12. The structure of the carriage assembly 20, step/platform assembly 22, extension/retraction mechanism 38, stow/deploy mechanism 40, and raise/lower mechanism 42 are well known in the art and are not discussed in detail herein.

In the preferred embodiment, both the slides 34 and rails 36 are made of metal, and the slides 34 have plastic strips 35 attached to the surfaces that contact the rails 36. The strips 35 enable easy sliding of the slides 34 on the rails 36. Although the strips 35 preferably are made of plastic, for example, polyurethane, the strips 35 may be made of any material having a low coefficient of friction that will enable easy sliding of the slides 34. The slides 34 have relatively large clearance with respect to the rails 36, such that when the step/platform assembly 22 is in the platform position, and the platform is in the raised position, the platform and slides 34 hang down at an angle of about 1° from the rails 36.

Figure 4:
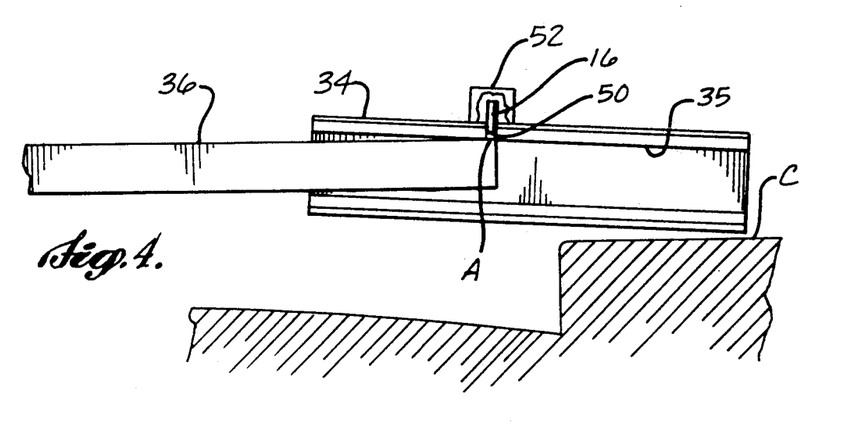
FIG. 4 is a schematic showing the relative position of one of the slides of the carriage assembly and the corresponding rail when the platform is being lowered toward a curb.
Figure 5:
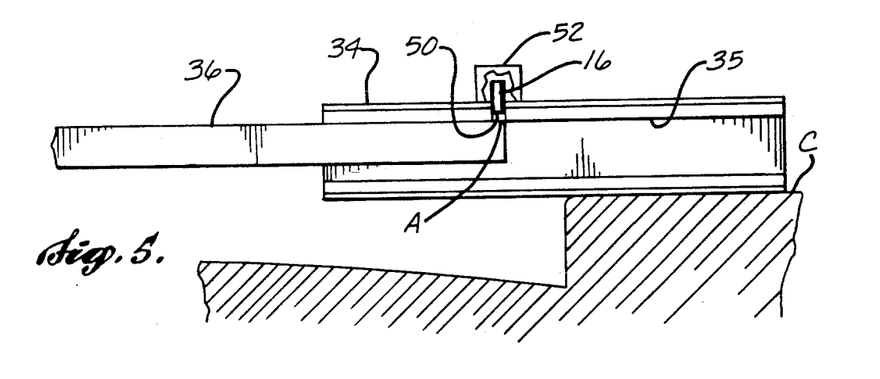
FIG. 5 is a schematic showing the relative position of one of the slides of the carriage assembly and the corresponding rail when the platform is parallel to the curb.
Figure 6:
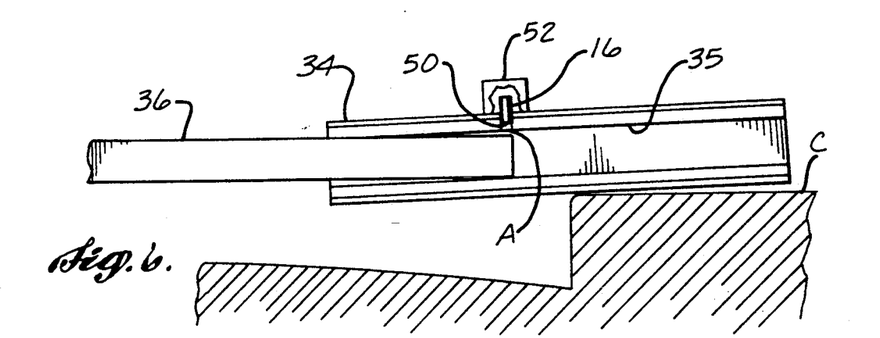
FIG. 6 is a schematic showing the relative position of one of the slides of the carriage assembly and the corresponding rail when the platform is pitched-up from the curb.

FIGS. 4, 5, and 6 are schematics showing the relative position of the platform and one of the slides 34 with respect to the rail 36 (a) when the platform is being lowered toward a curb (FIG. 4), (b) when the platform is parallel to the curb (FIG. 5), and (c) when the platform is pitched-up from the curb (FIG. 6). Since the differences in relative position between the platform and slide 34 with respect to the rail 36 are not readily discernible to the human eye in actual lift operation, such differences have been magnified in the schematics of FIGS. 4, 5, and 6 for purposes of illustration. FIG. 4 shows hanging down of the platform as the platform is being lowered toward the ground. As the carriage assembly 20 and the platform continue to travel downwardly, there is a point at which the platform is parallel to the ground, as shown in FIG. 5. As the carriage assembly 20 continues to move downwardly, the platform is pitched upwardly from the ground, as shown in FIG. 6.

When the platform is being lowered to the curb C, but has not yet contacted the curb C, the slide 34 contacts the rail 36 at the point designated "A" in FIG. 4, and the sensor 16 is in close proximity to the rail 36. When the platform is parallel to the curb C, the slide 34 is still in contact with the rail 36 at point A, as shown in FIG. 5, and the sensor 16 is still in close proximity to the rail 36. However, as soon as the platform is pitched upwardly, the slide 34 no longer contacts the rail 36 at point A, as shown in FIG. 6, and the distance between the sensor 16 and the rail 36 is increased.

The sensor 16 is inserted through a hole 50 in the slide 34 and is shielded by a cover 52 attached to the slide 34 in a conventional manner. The sensor 16 is positioned so as to detect the proximity of the rail 36 to determine if the platform has contacted the ground. In the preferred embodiment, the sensor 16 comprises an inductive proximity switch. When the platform does not contact the curb C (FIG. 4) or is parallel to the curb C (FIG. 5), the sensor 16 is in close proximity to the metal rail 36 such that the sensor 16 detects the presence of metal. When the platform contacts the curb C and is pitched upwardly, as shown in FIG. 6, the distance between the sensor 16 and the metal rail 36 is increased such that the sensor 16 no longer detects the presence of metal. At this time, the sensor 16 generates a control signal indicating ground contact. Depending on its configuration, the sensor 16 may generate a positive output or zero output when it detects the presence of metal. For example, the sensor may generate a zero output when it detects metal and a positive output when it does not detect metal, or the sensor may generate a positive output when it detects metal and a zero output when it does not detect metal. Thus, the term "control signal" used herein also encompasses a zero output.

FIG. 6 shows an extreme amount of pitch-up for purposes of illustration. However, in actual practice, it has been found that the sensor 16 generates a control signal indicating ground contact when only an extremely slight amount of pitch-up has occurred, so that lowering of the platform can be stopped substantially at a position in which the platform is parallel to the curb, as shown in FIG. 5. When the sensor 16 detects that the platform has contacted the curb C (i.e., when the sensor 16 does not detect the presence of metal), the sensor 16 generates a control signal that is transmitted to the control system of the lift 10, to stop vertical travel of the carriage assembly 20, and thus lowering of the platform.

The lift 10 also includes a controller 60 (FIG. 3) coupled to extension/retraction mechanism 38, stow/deploy mechanism 40, and raise/lower mechanism 42, for controlling the operation of these mechanisms. The controller 60 includes a known central processing unit. The controller 60 is also coupled to the sensor 16 so as to receive a control signal generated by the sensor 16 when the sensor 16 detects that the platform has contacted the ground.

Figure 7:
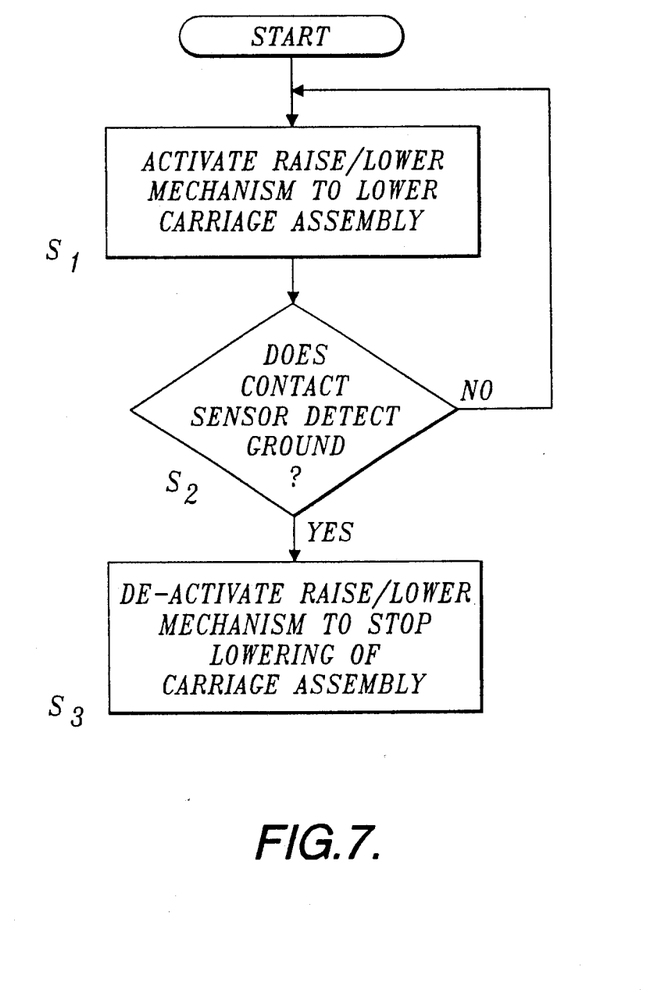
FIG. 7 is a flow diagram showing the operational steps of the controller during lowering of the lift platform.

FIG. 7 shows a flow diagram of a step lift having a sensor in accordance with the present invention. The step/platform assembly 22 is in the platform position and is ready to be lowered. The raise/lower mechanism 42 is activated to lower the carriage assembly 20, and hence the platform ($S_1$). The controller 60 then determines if the sensor 16 has generated a control signal indicating that the platform has contacted the ground ($S_2$). If the sensor 16 indicates that ground contact has not been made, activation of the raise/lower mechanism 42 to lower the carriage assembly 20, and thus the platform, continues. If the sensor 16 indicates that ground contact has been made, the controller 60 causes de-activation of the raise/lower mechanism 42 to stop lowering of the carriage assembly, and thus of the platform ($S_3$).

The presently contemplated best mode of carrying out the invention has been described above. Nevertheless, it should be understood that various modifications can be made to this preferred embodiment without departing from the spirit and scope of the invention. For example, the carriage and platform assemblies may have different structures. Also, a different type of sensor may be used to detect contact. Although the preferred embodiment uses an inductive proximity sensor, any type of sensor operable to detect if the platform is pitched upwardly may be used. Moreover, the sensor may be mounted at a different position, for example, facing the underside of the rail. In that case, the sensor would still be configured to generate a signal indicating ground contact when the platform was pitched up, but, for example, would detect the presence of metal at a reference point adjacent the underside of the rail.

The embodiments of the invention in which an exclusive property or privilege is claimed are defined as follows:

1. A lift designed to be installed in the entryway of a vehicle, the lift comprising:
   a carriage attachable to the vehicle and movable between an upper position and a lower position, the carriage including at least one horizontally extending support member;
   a platform attached to the support member for carrying by the carriage, the platform having an upper surface and a lower surface, wherein the platform is in a first relative position with respect to the support member when the platform is in the upper position and the platform is in a second relative position with respect to the support member when the platform is in the lower position;

a raise/lower mechanism, operatively connected to the carriage, for causing the carriage and the platform to move between the upper and lower positions;

a sensor that detects a relative position of the platform with respect to the support member and generates a control signal when the second relative position is detected, the sensor being configured to directly detect the relative position of the platform with respect to the support member at a location shielded from the outside environment.

2. The lift of claim 1, further comprising a controller connected to the sensor and to the raise/lower mechanism, that controls the raise/lower mechanism to stop lowering of the platform when the controller receives the control signal from the sensor.

3. The lift of claim 1, wherein the platform comprises a plurality of plates, each plate pivotally connected to an adjacent plate so as to be movable between a step position in which the plates define at least one step and a platform position in which the plates define a substantially planar surface.

4. The lift of claim 1 wherein the support member is made of metal and the sensor comprises an inductive proximity switch.

5. The lift of claim 1 wherein the sensor is mounted to the platform.

6. A lift designed to be installed in the entryway of a vehicle, the lift comprising:

a carriage attachable to the vehicle and movable between an upper position and a lower position, the carriage including at least one horizontally extending support member;

a platform attached to the support member for carrying by the carriage;

a raise/lower mechanism, operatively connected to the carriage, for causing the carriage and the platform to move between the upper and lower positions;

a sensor, operatively connected to the platform, wherein the sensor changes position relative to the support member when the platform moves between the upper and lower positions, and wherein the sensor is configured to directly detect a distance between the sensor and a location on the support member shielded from the outside environment and generates a control signal corresponding to the platform lower position when the sensor detects a predetermined distance between the sensor and the support member.

7. The lift of claim 6, further comprising a controller connected to the sensor and to the raise/lower mechanism, that controls the raise/lower mechanism to stop lowering of the platform when the controller receives the control signal from the sensor.

8. The lift of claim 6, wherein the platform comprises a plurality of plates, each plate pivotally connected to an adjacent plate so as to be movable between a step position in which the plates define at least one step and a platform position in which the plates define a substantially planar surface.

9. The lift of claim 6 wherein the support member is made of metal and the sensor comprises an inductive proximity switch.

10. A lift designed to be installed in the entryway of a vehicle, the lift comprising:

a platform for carrying an object;

a carriage that supports the platform, the carriage having a curbside end, and the carriage and platform being movable between an upper position and a lower position, wherein when the carriage and the platform are in the upper position, the platform hangs down from the curbside end of the carriage and when the carriage and the platform are in the lower position, the platform is pitched upward relative to the curbside end of the carriage;

a raise/lower mechanism for moving the carriage and platform between the upper and lower positions; and a sensor, operatively connected to at least one of the platform and the carriage and shielded from the outside environment, that detects hanging down of the platform relative to the curbside end of the carriage and pitching up of the platform relative to the curbside end of the carriage and generates a control signal corresponding to the lower position when the sensor detects that the platform is pitched upward relative to the curbside end of the carriage.

11. The lift of claim 10, further comprising a controller connected to the sensor and to the raise/lower mechanism, that controls the raise/lower mechanism to stop lowering of the platform when the controller receives the control signal from the sensor.

12. The lift of claim 10, wherein the platform comprises a plurality of plates, each plate pivotally connected to an adjacent plate so as to be movable between a step position in which the plates define at least one step and a platform position in which the plates define a substantially planar surface.

13. A lift designed to be installed in the entryway of a vehicle, the lift comprising:

a step/platform assembly attached to the carriage and including a plurality of plates, wherein each plate is pivotally connected to an adjacent plate, and wherein the plurality of plates may be moved between a step position in which the plates form at least one step and a platform position in which the plates form a substantially planar platform, the platform being movable between an upper position and a lower position;

a pair of slides operatively connected to the step/platform assembly;

a pair of rails on which the pair of slides ride, respectively, wherein each of the slides and the corresponding rail assume a first relative position when the platform is in the upper position and a second relative position when the platform is in the lower position;

a raise/lower mechanism, operatively connected to the step/platform assembly, for causing the plates, when in the platform position, to move between the upper and lower positions; and a sensor, shielded from the outside environment, that detects a position of one of the slides and corresponding rail and generates a control signal corresponding to the platform lower position when the sensor detects that the position of the slide relative to the corresponding rail is the second relative position.

14. The lift of claim 13, further comprising a controller connected to the sensor and to the raise/lower mechanism, that controls the raise/lower mechanism to stop lowering of the platform when the controller receives the control signal from the sensor.

15. The lift of claim 13, wherein the corresponding rail is made of metal and the sensor comprises an inductive proximity switch.

16. The lift of claim 13, wherein the sensor is attached to one of the slides.

17. A lift designed to be installed in the entryway of a vehicle, the lift comprising:
 a carriage movable between a vehicle floor-level position and a curb-level position, and including a first member and a second member;
 a platform carried by the carriage, wherein the second member is connected to the platform such that the second member moves concurrently with the platform and is movable relative to the first member, wherein the first member is in a first relative position with respect to the second member when the platform is in the vehicle floor-level position and the first member is in a second relative position with respect to the second member when the platform is in the curb-level position;
 a raise/lower mechanism for moving the carriage and the platform between the vehicle floor-level position and the curb-level position; and
 a sensor that generates a control signal corresponding to the curb-level position when the sensor detects that the first member is in the second relative position with respect to the second member, the sensor being configured to detect the relative position of the first member with respect to the second member at a location shielded from the outside environment.

18. The lift of claim 17, further comprising a controller connected to the sensor and to the raise/lower mechanism, that controls the raise/lower mechanism to stop lowering of the platform when the controller receives the control signal corresponding to the curb-level position from the sensor.

19. The lift of claim 17, wherein the platform comprises a plurality of plates, each plate pivotally connected to an adjacent plate so as to be movable between a step position in which the plates define at least one step and a platform position in which the plates define a substantially planar surface.

20. The lift of claim 17, wherein the first member is made of metal and the sensor comprises an inductive proximity switch.

21. The lift of claim 17 wherein the sensor is attached to the second member.

22. A sensing device for use with a vehicle lift having a platform for carrying an object and a carriage that supports the platform, the carriage and the platform being movable between a vehicle floor-level position and a curb-level position, the sensing device comprising:
 a first member connectable to the carriage;
 a second member connectable to the platform such that the second member moves concurrently with the platform and is movable relative to the first member, wherein the first member is in a first relative position with respect to the second member when the platform is in the vehicle floor-level position and the first member is in a second relative position with respect to the second member when the platform is in the curb-level position; and
 a sensor that generates a control signal corresponding to the curb-level position when the sensor detects that the first member is in the second relative position with respect to the second member, the sensor being configured to detect the relative position of the first member with respect to the second member at a location shielded from the outside environment.

23. The sensing device of claim 22, wherein the sensor is attached to the second member, and wherein the first member is made of metal and the sensor comprises an inductive proximity switch.

24. A lift designed to be installed in the entryway of a vehicle, the lift comprising:
 a carriage attachable to the vehicle and movable between an upper position and a lower position, the carriage including at least one horizontally extending support member having an inward end portion extending inwardly toward the vehicle and an outward end portion extending outwardly away from the vehicle;
 a platform attached to the support member for carrying by the carriage, the platform having an upper surface and a lower surface, wherein the platform is in a first relative position with respect to the support member when the platform is in the upper position and the platform is in a second relative position with respect to the support member when the platform is in the lower position;
 a raise/lower mechanism, operatively connected to the carriage, for causing the carriage and the platform to move between the upper and lower positions; and
 a sensor that detects a relative position of the platform with respect to the support member and generates a control signal when the second relative position is detected, the sensor being located adjacent the outward end portion of the support member at least when the platform is in the lower position.

25. A lift designed to be installed in the entryway of a vehicle, the lift comprising:
 a platform for carrying an object;
 a carriage that supports the platform, the carriage having a curbside end, and the carriage and platform being movable between an upper position and a lower position, wherein when the carriage and the platform are in the upper position, the platform hangs down from the curbside end of the carriage and when the carriage and the platform are in the lower position, the platform is pitched upward relative to the curbside end of the carriage;
 a raise/lower mechanism for moving the carriage and platform between the upper and lower positions; and
 a sensor, adjacent the curbside end of the carriage at least when the platform is in the lower position, the sensor detecting hanging down of the platform relative to the curbside end of the carriage and pitching up of the platform relative to the curbside end of the carriage and generating a control signal corresponding to the lower position when the sensor detects that the platform is pitched upward relative to the curbside end of the carriage.

26. A lift designed to be installed in the entryway of a vehicle, the lift comprising:

a step/platform assembly attached to the carriage and including a plurality of plates, wherein each plate is pivotally connected to an adjacent plate, and wherein the plurality of plates may be moved between a step position in which the plates form at least one step and a platform position in which the plates form a substantially planar platform, the platform being movable between an upper position and a lower position;

a pair of slides operatively connected to the step/platform assembly;

a pair of rails on which the pair of slides ride, respectively, each rail having a curbside end, wherein each of the slides hangs down from curbside end of the corresponding rail when the platform is in the upper position and wherein each of the slides is pitched upward relative to the curbside end of the corresponding slide when the platform is in the lower position;

a raise/lower mechanism, operatively connected to the step/platform assembly, for causing the plates, when in the platform position, to move between the upper and lower positions; and a sensor adjacent the curbside end of at least one of the rails when the step/platform assembly is in the platform position, the sensor generating a control signal corresponding to the platform lower position when the sensor detects a predetermined airgap between the rail and the corresponding slide.

* * * * *